Patented Oct. 28, 1941

2,261,024

UNITED STATES PATENT OFFICE 2,261,024

VULCANIZATION ACCELERATOR

Roy S. Hanslick, New Haven, Conn., assignor to United States Rubber Company, New York, N. Y., a corporation of New Jersey No Drawing. Application June 22, 1939, Serial No. 280,444

6 Claims. (Cl. 260—788)

This invention relates to a new class of compounds which have been found valuable as accelerators of the vulcanization of rubber.

The new class of rubber vulcanization accelerators are the reaction products of 1-mercaptoaryl thiazoles with monochloramine, preferably with an aqueous solution containing the monochloramine. The reaction is carried out at temperatures between 0 and 100° C. and preferably between 0 and 10° C. The resulting products may be called arylene thiazyl sulfamines, and are believed to have the general formula

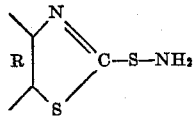

where R is an arylene group.

The following examples are given to illustrate the invention:

EXAMPLE 1

A water solution containing 94.5 grams (0.5 mole) of sodium mercaptobenzothiazole is cooled to 0–5° C. by means of an ice-water bath. A freshly prepared solution of 25.8 (plus 10% excess) grams (0.5 mole) of aqueous monochloramine chilled to 0–5° C. is slowly added, to the aqueous sodium mercaptobenzothiazole solution. Rapid stirring is employed during this addition. Upon the complete addition of the monochloramine in aqueous solution, stirring is continued for 5 to 10 minutes whereupon the white material is then filtered off and washed with water. The white material is then dried. Melting point is 126–127° C. (uncorrected). Benzothiazyl sulfamine is obtained in a yield of 88–89 grams.

Analysis

| | Theory | Obtained |
|---|---|---|
| Nitrogen | 15.4 | 14.83 |
| Sulfur | 35.2 | 34.8 |

EXAMPLE 2

16.7 grams (0.1 mole) of 1-mercaptobenzothiazole is dissolved in approximately 300 cc. of concentrated ammonium hydroxide (4.6 moles ammonia) and then cooled to 0–5° C. by means of an ice-water bath. To this is then slowly added a cold aqueous solution of sodium hypochlorite (1.5 moles) of approximately 125 cc. volume. Some water is added (125 cc.) to facilitate easy and rapid stirring during this addition. Upon the complete addition of the sodium hypochlorite solution, stirring is continued for about five minutes whereupon the white material is then filtered off and washed with water. The material is then dried. Melting point of crude material is 121–122° C., crystallized from benzene melting point is 128–129° C. Benzothiazyl sulfamine is obtained in the yield of 17–17.5 grams.

In Example 2 the monochloramine is formed by the action of the hypochlorite on the ammonia in solution and this in turn reacts with the ammonium salt of the mercaptobenzothiazole which in turn is formed when the mercaptobenzothiazole is dissolved in the concentrated ammonium hydroxide.

Other hypochlorites may be used including those of potassium, lithium, calcium, etc. Other metal thiazyl mercaptides may be reacted with the monochloramine including those of sodium, potassium, calcium, barium, etc. It is also to be understood that other mercapto aryl thiazoles may be used including those of the naphthalene and anthracene series, substituted or not in the aryl nucleus by a radical such as chloro, nitro, hydroxy, alkoxy, amino, etc.

The following data illustrates the usefulness of the materials as accelerators of vulcanization; the parts are by weight:

Recipe

| | |
|---|---|
| Pale crepe | 100 |
| Zinc oxide | 10 |
| Lithopone | 40 |
| Whiting | 50 |
| Suprex clay | 25 |
| Zinc soap of cocoanut oil acids | 1 |
| Sulfur | 3 |
| Master batch | 229 |
| Benzothiazyl sulfamine | 0.625 |

Tensiles

| Cure in minutes at 30 lbs./sq. in. steam pressure | T | E |
|---|---|---|
| 20 | 660 | 550 |
| 30 | 1760 | 570 |
| 45 | 1960 | 570 |
| 60 | 2070 | 583 |
| 75 | 1860 | 550 |

T = ultimate tensiles in pounds per square inch.
E = percent elongation at break.

If desired, the new accelerators may be used with any of the well-known basic nitrogen-containing accelerators used in activating the accelerators of mercapto thiazole type accelerators, including the guanidine and substituted guanidine salts, such as diphenyl guanidine salt of aliphatic, and of aromatic acids.

The invention may be applied to the vulcanization of natural rubbers as well as artificially prepared rubbers adaptable to vulcanization with sulfur, including reclaims and latices of such rubber compositions.

The present invention is not limited to the specific examples above set forth wherein the preferred accelerator is employed. Other ratios of the compounding ingredients than those mentioned in the examples as well as other well known fillers, pigments and the like may be employed in the production of various types of rubber compounds as will be apparent to those skilled in the art to which this invention pertains.

Having thus described my invention, what I claim and desire to protect by Letters Patent is:

1. A process of accelerating the vulcanization of rubber which comprises vulcanizing it in the presence of an arylenethiazyl sulfamine having the general formula

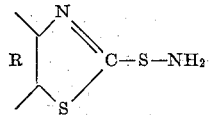

where R is an arylene group.

2. A process of accelerating the vulcanization of rubber which comprises vulcanizing it in the presence of an accelerator which is a product of reaction of a salt of a mercapto-aryl-thiazole and monochloramine.

3. A process of accelerating the vulcanization of rubber which comprises vulcanizing it in the presence of bezothiazyl sulfamine.

4. A process of accelerating the vulcanization of rubber which comprises vulcanizing it in the presence of an accelerator which is the product of reaction of a salt of mercaptobenzothiazole and monochloramine.

5. A rubber product which has been vulcanized in the presence of an arylenethiazyl sulfamine having the general formula

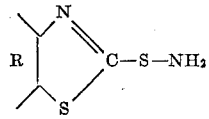

where R is an arylene group.

6. A rubber product which has been vulcanized in the presence of an accelerator which is a product of reaction of a salt of mercapto-aryl-thiazole and monochloramine.

ROY S. HANSLICK.

DISCLAIMER 2,261,024.—*Roy S. Hanslick*, New Haven, Conn. VULCANIZATION ACCELERATOR.
Patent dated October 28, 1941. Disclaimer filed August 20, 1942, by the assignee, *United States Rubber Company*.

Hereby enters this disclaimer to claims 1, 3, and 5 of said patent.

[*Official Gazette September 15, 1942.*]